(12) United States Patent
Santos Martinez et al.

(10) Patent No.: US 12,142,931 B1
(45) Date of Patent: Nov. 12, 2024

(54) PULSE WIDTH MODULATED INVERTER CONTROL WITH MULTI-STATE SIGNALING

(71) Applicant: Apple Inc., Cupertino, CA (US)

(72) Inventors: Jose V Santos Martinez, San Jose, CA (US); Yongxuan Hu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 17/804,918

(22) Filed: Jun. 1, 2022

Related U.S. Application Data

(60) Provisional application No. 63/268,823, filed on Mar. 3, 2022.

(51) Int. Cl.
*H02J 50/00* (2016.01)
*H02J 50/12* (2016.01)
*H02M 7/5395* (2006.01)

(52) U.S. Cl.
CPC ............ *H02J 50/005* (2020.01); *H02J 50/12* (2016.02); *H02M 7/5395* (2013.01)

(58) Field of Classification Search
CPC ......... H02J 50/00; H02J 50/12; H02M 7/5395
See application file for complete search history.

(56) References Cited

U.S. PATENT DOCUMENTS

| 7,688,048 B2 | 3/2010 | Nielsen |
| 8,125,803 B2 | 2/2012 | Honsberg et al. |
| 9,793,799 B1 | 10/2017 | Babazadeh et al. |
| 2014/0035552 A1* | 2/2014 | Dai ...................... H02M 3/1588 323/311 |
| 2019/0379310 A1* | 12/2019 | Yang .......................... H02P 6/28 |
| 2021/0083524 A1* | 3/2021 | Mynar .................... H02J 50/80 |
| 2023/0238831 A1* | 7/2023 | Choi .................... H02M 7/5395 307/104 |

FOREIGN PATENT DOCUMENTS

CN             113497572 A       10/2021

\* cited by examiner

*Primary Examiner* — Rexford N Barnie
*Assistant Examiner* — Joseph N Inge
(74) *Attorney, Agent, or Firm* — FLETCHER YODER PC

(57) ABSTRACT

A wireless power transmitter can include a wireless power transmitter coil adapted to magnetically couple the wireless power transmitter to a wireless power receiver, a resonant capacitor coupled to the wireless power transmitter coil to form a resonant circuit, and an inverter having an input that receives a DC voltage and an AC output coupled to the resonant circuit. The inverter can further include a plurality of switching devices coupled between the input and AC output of the inverter, a controller configured to generate pulse width modulated (PWM) drive signals for the plurality of switching devices, wherein the PWM drive signals are tri-state PWM signals having three output levels, and zero crossing detection circuitry that receives the PWM drive signals for corresponding switching devices and signals corresponding to voltages across the corresponding switching devices and generates gate drive signals for the corresponding switching devices.

20 Claims, 3 Drawing Sheets

PULSE WIDTH MODULATED INVERTER CONTROL WITH MULTI-STATE SIGNALING

CROSS-REFERENCE TO RELATED APPLICATIONS

This application claims priority to and benefit of U.S. Provisional Application No. 63/268,823, filed Mar. 3, 2022, and entitled "PWM CONTROL WITH MAX DEAD TIME ENCODING USING TRI-STATE SIGNALS," which is incorporated herein by reference in its entirety for all purposes.

BACKGROUND

Wireless power transfer ("WPT"), such as inductive power transfer ("IPT"), is used in various battery-powered electronic devices. One application in which WPT has seen increases in use is the consumer electronics space around devices such as mobile phones (i.e., smart phones) and their accessories (e.g., wireless earphones, smart watches, etc.) as well as tablets and other types of portable computers and their accessories (e.g., styluses, etc.). In these various applications of wireless power transfer, different design optimization decisions may be employed.

SUMMARY

A wireless power transmitter can include a wireless power transmitter coil adapted to magnetically couple the wireless power transmitter to a wireless power receiver, a resonant capacitor coupled to the wireless power transmitter coil to form a resonant circuit, and an inverter having an input that receives a DC voltage and an AC output coupled to the resonant circuit. The inverter can further include a plurality of switching devices coupled between the input and AC output of the inverter, a controller configured to generate pulse width modulated (PWM) drive signals for the plurality of switching devices, wherein the PWM drive signals are tri-state PWM signals having three output levels, and zero crossing detection circuitry that receives the PWM drive signals for corresponding switching devices and signals corresponding to voltages across the corresponding switching devices and generates gate drive signals for the corresponding switching devices.

The controller can include a maximum dead time generator that determines a maximum dead time between deactivation of a first switching device and activation of a second, complementary switching device. The maximum dead time can be encoded in one of the three output levels of the tri-state PWM signal. In a first state of a tri-state PWM signal corresponding to a first output level of the three output levels, the corresponding switching device can be turned off. In a second state of the tri-state PWM signal corresponding to a second output level of the three output levels, the corresponding switching device can be forced on in a hard switching event. In a third state of the tri-state PWM signal corresponding to a third output level of the three output levels, the corresponding switching device can be allowed to turn on in a soft switching event upon occurrence of a zero crossing of the voltage across the corresponding switching device. The first output level can be a zero voltage level, the second output level can be a high voltage level, and the third output level can be an intermediate voltage level between the zero voltage level and the high voltage level. The PWM drive signals can regulate an output voltage of the inverter. The PWM drive signals can regulate an output power level of the inverter.

An inverter can have an input that receives a DC voltage and an AC output coupled to a resonant circuit. The inverter can include a plurality of switching devices coupled between the input and AC output of the inverter, a controller configured to generate pulse width modulation (PWM) drive signals for the plurality of switching devices, wherein the PWM drive signals are tri-state PWM signals having three output levels, and zero crossing detection circuitry receives PWM drive signals for corresponding switching devices and signals corresponding to voltages across the corresponding switching device and generates gate drive signals for the corresponding switching devices.

In a first state of a tri-state PWM signal corresponding to a first output level of the three output levels, the corresponding switching device can be turned off. In a second state of the tri-state PWM signal corresponding to a second output level of the three output levels, the corresponding switching device can be forced on in a hard switching event. In a third state of the tri-state PWM signal corresponding to a third output level of the three output levels, the corresponding switching device can be allowed to turn on in a soft switching event upon occurrence of a zero crossing of the voltage across the corresponding switching device. The first output level can be a zero voltage level, the second output level can be a high voltage level, and the third output level can be an intermediate voltage level between the zero voltage level and the high voltage level. The controller can include a maximum dead time generator that determines a maximum dead time between deactivation of a first switching device and activation of a second, complementary switching device. The maximum dead time can be encoded in one of the three output levels of the tri-state PWM signal. The PWM drive signals can regulate an output voltage of the inverter. The PWM drive signals can regulate an output power level of the inverter.

A switching converter that converts an input voltage into an output voltage can include one or more switching device pairs each comprising switching devices operated by tri-state pulse width modulation (PWM) drive signals having a low level, a high level, and an intermediate level. The switching converter can further include control circuitry having a pulse width modulation (PWM) controller that generates raw PWM signals corresponding to the one or more switching device pairs, zero crossing detector circuitry that senses voltages across corresponding switching devices, a maximum dead time generator that determines a maximum dead time between deactivation of a first switching device and activation of a second, complementary switching device of a switching device pair, and control logic that combines output signals from the PWM controller, the zero crossing detector circuitry, and the maximum dead time generator to generate the tri-state PWM drive signals.

In a first state of a tri-state PWM drive signal, the corresponding switching device can be turned off. In a second state of the tri-state PWM drive signal, the corresponding switching device can be forced on. In a third state of the tri-state PWM drive signal, the corresponding switching device can be allowed to turn on upon occurrence of a zero crossing of the voltage across the corresponding switching device. The first output level can be a zero voltage level, the second output level can be a high voltage level, and the third output level can be an intermediate voltage level between the zero voltage level and the high voltage level.

A wireless power transmitter can include a switching converter as described above. An output of the switching converter can coupled to a resonant circuit comprising a wireless power transmitter coil of the wireless power transmitter. The tri-state PWM drive signals can regulate an output voltage of the switching converter. The tri-state PWM drive signals can regulate an output power level of the switching converter.

DETAILED DESCRIPTION

Figure 1:
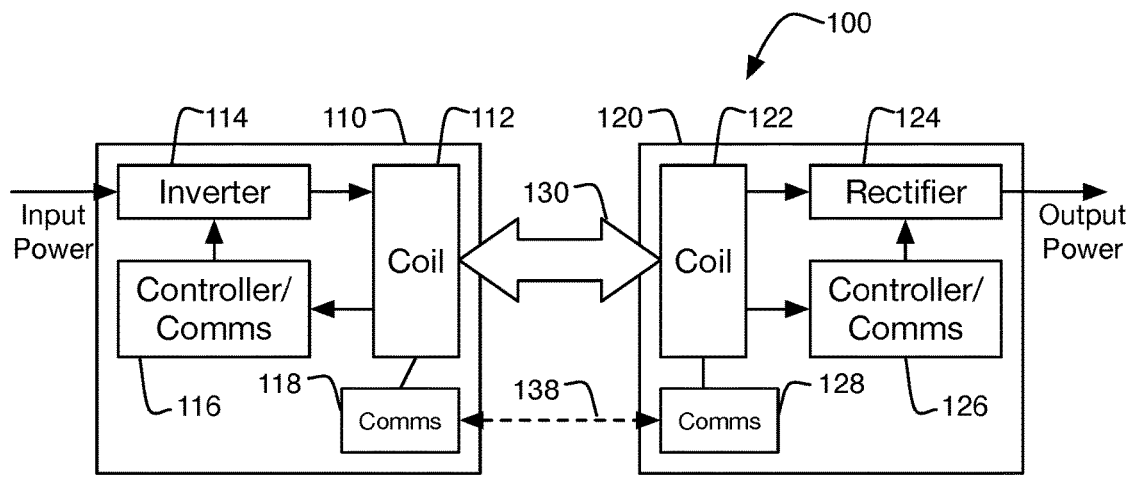
FIG. 1 illustrates a block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as an winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
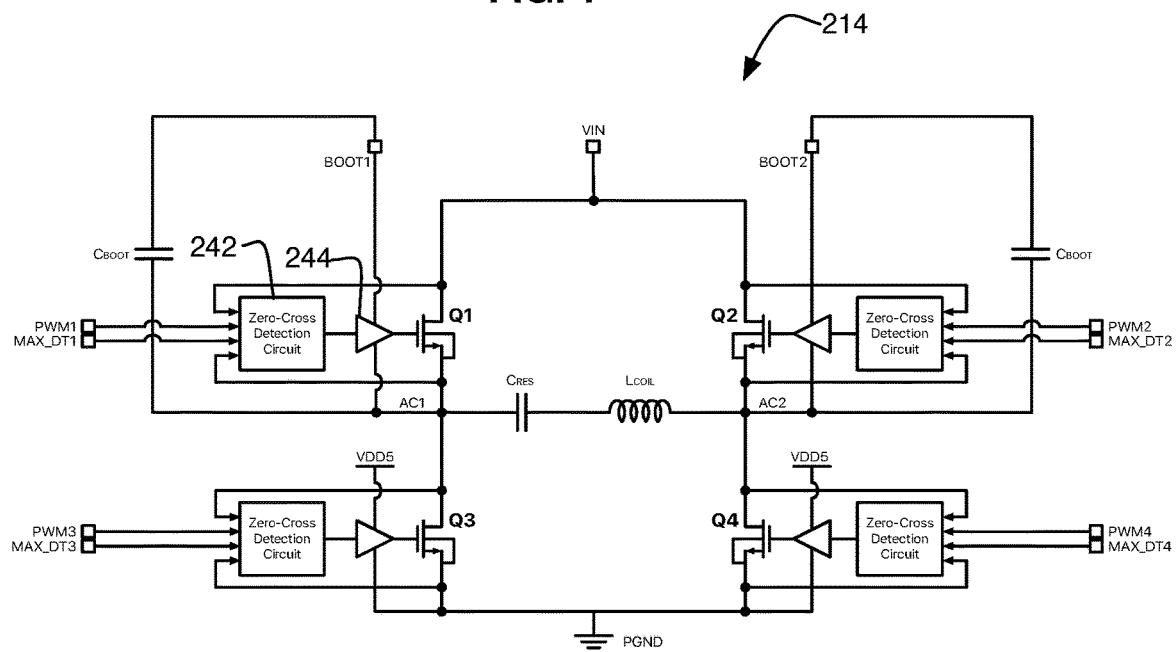
FIG. 2 illustrates a simplified schematic of an inverter.
Figure 2:
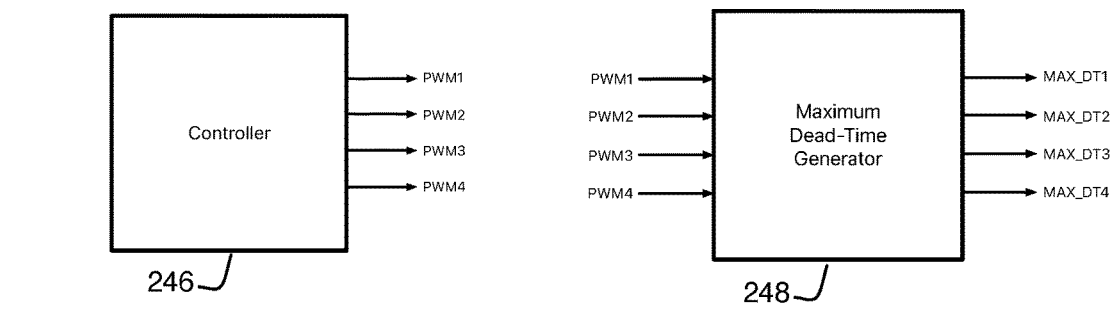

FIG. 2 illustrates a simplified schematic of an inverter 214. Inverter 214 is a full-bridge resonant inverter, which receives a DC input presented between the Vin and PGND terminals and produces an AC output at the AC1/AC2 terminals. A series resonant circuit including resonant capacitor Cres and Lcoil is coupled between the AC output terminals of inverter 214. In the case of a wireless power transfer system, Lcoil can be the transmitter coil, e.g., coil 112 discussed above. A full bridge switching arrangement including switching devices Q1, Q2, Q3, and Q4 may be operated to selectively couple the input voltage to the series resonant circuit. These switching devices are illustrated as MOSFETs (metal oxide semiconductor field effect transistors), but could be any of a variety of switching devices, such as BJTs (bipolar junction transistors), IGBTs (insulated gate bipolar transistors), SCRs (silicon/semiconductor controlled rectifiers), etc. The switching devices can be formed from any suitable semiconductor material, such as silicon, silicon carbide (SiC), gallium nitride (GaN), or any other suitable semiconductor substrate according to known processes.

Basic operation of the full bridge resonant inverter 214 is as follows: A first switch pair, e.g., switches Q1 and Q4 may be closed to apply the input DC voltage across the series resonant circuit. This causes a quasi-sinusoidal current flow that stores energy in the resonant circuit (also known as a resonant tank). The first complementary switch pair may be turned off, and resonant operation of the resonant tank can cause the stored energy to be discharged to a load connected to the AC output terminals AC1/AC2. Subsequently, the second switch pair, in this case switches Q2 and Q4, may be closed to apply the input DC voltage across the series resonant circuit in the opposite direction as previously. This causes a quasi-sinusoidal current flow (in the opposite direction as discussed above) that stores energy in the resonant circuit/tank. The second complementary switch pair may be turned off, and resonant operation of the resonant tank can cause the stored energy to be discharged to a load connected to the AC output terminals AC1/AC2.

Modulating the frequency, timing, and/or duty cycle of the switching devices can be used to regulate the output voltage, current, and/or power that is delivered to the load. In some embodiments, pulse width modulation may be used in which the width of the drive pulses provided to the switching devices is modulated to achieve the desired output regulation. As one example, controller 246 can generate pulse width modulation signals PWM1-PWM4, which can be supplied to the corresponding switching devices Q1-Q4 via the associated drive circuitry discussed in greater detail below. Controller 246 may receive one or more feedback signals that can be compared to corresponding reference signal(s) to generate error signal(s) that are fed to the PWM generation circuitry to generate the PWM signals. In some embodiments, the feedback signal(s) can correspond to the output voltage, current, and or power of the AC inverter. In some embodiments the feedback signal(s) may correspond to voltage, current, and/or power signals received from a wireless power receiver, e.g., via the communications path 128/138/118 discussed above. In some embodiments, the feedback signals can come from both the inverter output and a wireless power receiver.

Controller 246 may be implemented in a variety of ways. In some embodiments, controller 246 could be based on analog control circuitry. In some embodiments, controller 246 could be based on discrete digital logic circuitry. In some embodiments, controller 246 could be based on programmable control circuitry, such as a microcontroller, microprocessor, or FPGA (field programmable gate array). In some embodiments, controller 246 may be based on hybrid circuitry that includes both analog and digital components. The circuitry making up controller 246 may be located on a single IC (integrated circuit) or could be divided among multiple ICs, which could be ASIC(s) (application specific integrated circuits).

To improve operating efficiency of an inverter as described above, it may be desirable to employ zero voltage switching (ZVS). This can reduce switching losses associated with the turn on of switches Q1-Q4. In resonant inverter 214, each switch has a corresponding zero crossing detection circuit 242 that can monitor one or more signals corresponding to: (1) the DC bus voltage associated with the switch, (2) the AC output terminal voltage associated with the switch, (3) the PWM drive signal associated with the switch, and (4) a maximum dead time signal (described in greater detail below) associated with the switch. In some embodiments, more than one switching device can be associated with a zero crossing detection circuit. For example, a single zero crossing detection circuit could be associated with a high side switching device and a low side switching device or could be associated with all switching devices of the inverter. Zero cross detection circuit 242 can include internal logic that then turns the switch(es) on or off at an appropriate time, as determined by PWM controller 246, and also at a zero-crossing of the voltage appearing across the corresponding switching device(s). For example, switch Q1 will have zero voltage across it when the input DC voltage at terminal Vin is equal to the voltage at AC output terminal AC1. Similarly, switch Q2 will have zero voltage across it when the input DC voltage at terminal Vin is equal to the voltage at the AC output terminal AC2. Switch Q3 will have zero voltage across it when the voltage at AC output terminal AC1 is equal to zero (because switch Q3 is connected to ground). Likewise, switch Q4 will have zero voltage across it when the voltage at AC output terminal AC2 is equal to zero (because switch Q3 is connected to ground).

In other words, zero cross detection circuit 242 for each switch receives as inputs: (1) the voltage across the corresponding switch, (2) the PWM drive signal associated with the switch, and (3) a maximum dead time signal associated with the switch (discussed below). As noted above, zero cross detection circuits 242 could be integrated so that a single zero crossing detection circuitry could operate multiple switches based on appropriate corresponding signals. In any case, zero cross detection circuit 242 compares these signals using internal logic to generate an output gate drive signal (or signals) for the corresponding switch (or switches). As with controller 246, above, the internal logic of zero cross detection circuit 242 can be any suitable combination of analog, digital, and/or programmable circuitry implemented using any combination of discrete or integrated components. In at least some applications, the zero cross detection circuitry could be implemented as part of the same integrated circuit implementing controller 246 and/or maximum dead time generator circuit 248 (discussed in greater detail below). The output of zero cross detection circuit 242 may include a gate drive signal for the corresponding switch. In some cases, there may be additional signal conditioning elements 244 between the output of the zero cross detection circuit 242 and the corresponding switch. These signal conditioning elements may include level shifters, logic inverters, amplifiers, etc. to convert the electrical characteristics output signal from zero crossing detection circuit 242 to match the particular electrical characteristics required of the gate drive signal for a particular switching device type or configuration.

As described above, inverter 214 may preferably employ ZVS operation to reduce switching losses. In a ZVS operation, residual energy from the resonant tank can cause a reverse current to flow through the intrinsic body diode of switches Q1-Q4 (where Q1-Q4 are MOSFETs). If devices other than MOSFETs are used, a separate diode may be coupled in antiparallel with the switching device to achieve the same effect. In either case, the forward biasing of the body/antiparallel diode causes a voltage that is effectively zero to appear across the switching device prior to turn on. (The voltage may be slightly non-zero due to the forward voltage diode drop.) Thus, when the switch is turned on the switching losses are substantially reduced because of the essentially zero voltage across the switch. However, in some operating regimes—for example when operating at extremely light load—there may not be sufficient residual energy stored in the resonant tank to achieve ZVS (a/k/a "soft switching"). In this case, to ensure continued operation of the inverter, the next switch pair must still eventually turn on, even if this turn on is a non-ZVS or "hard switching" event.

To achieve this, a maximum dead time generator 248 can supply a maximum dead time signal MAX_DT1-MAX_DT4 for each switching device. These max dead time signals may be provided to respective zero cross detection circuits 242, and the logic therein may use these max dead time signals to trigger turn on of the respective switch, even if a zero crossing of the voltage across the switch has not occurred. The event could be a hard switching event but helps ensure continued stable operation of the inverter. Maximum dead time generator 248 can receive the PWM signals PWM1-PWM4 for the respective switching device as inputs. Maximum dead time generator 248 can include internal control logic or circuitry that derives the maximum dead time from these PWM signals (with the maximum dead time also being affected by switching frequency, load on the inverter, etc.). As discussed above with respect to controller 246 and zero cross detection circuits 242, the internal circuitry of max dead time generator 248 can include any suitable combination of analog, digital, hybrid analog-digital, discrete, and/or integrated circuitry that is configured to generate maximum dead time signals MAX_DT1-MAX_DT4 that comply with the operating requirements of a given application or embodiment. This circuitry may be integrated with controller 246 and/or with zero cross detection circuit 242 or may be separate from either. In some cases, maximum dead time may be fixed as a function of a parameter such as switching frequency, with appropriate values being hard coded, stored in a look up table, or otherwise made available to the system by maximum dead time generator 248.

Figure 3:
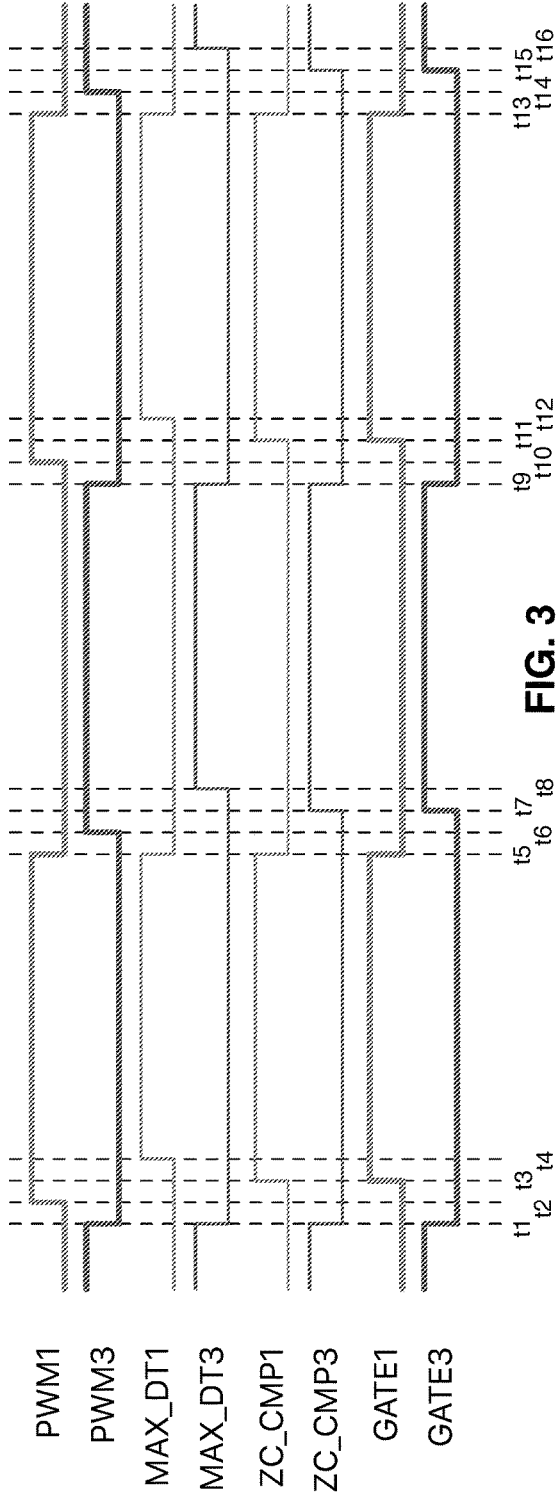
FIG. 3 illustrates waveforms associated with soft switching of an inverter with conventional PWM signals.
Figure 4:
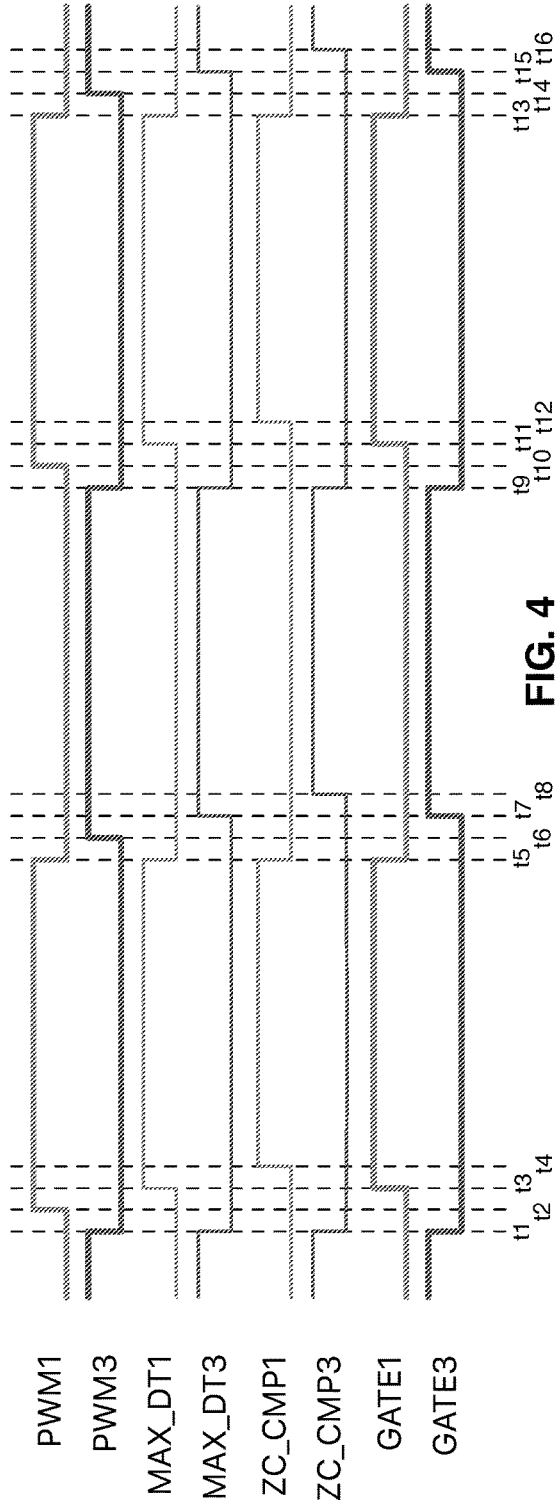
FIG. 4 illustrates waveforms associated with hard switching of an inverter with conventional PWM signals.

Operation of a soft switching resonant inverter controlled by PWM and max dead time signals may be further understood with reference to FIG. 3, which illustrates waveforms associated with soft switching of an inverter with conventional PWM signals, and FIG. 4, illustrates waveforms associated with hard switching of an inverter with conventional PWM signals. FIG. 3 illustrates a plurality of waveforms associated with switches Q1 and Q3 of inverter 214. The signals associated with switches Q4 and Q2 are generally correspond to the signals associated with switches Q1 and Q3, based on the resonant inverter operation described above. Likewise, the signals associated with switch Q1 are substantially complementary to the signals for switch Q3, meaning that when signals associated with switch Q1 are high, signals associated with switch Q3 are low, and vice versa-less various slight dead times between switching events. Understanding of this substantially complementary operation may be understood further with reference to the below description.

FIG. 3 illustrates four signals for each of switches Q1 and Q3. Signals PWM1 and PWM2 are the PWM signals produced by controller 246 to control the duty cycles of switches Q1 and Q3 to provide the desired regulation of inverter 214. Signals MAX_DT1 and MAX_DT3 are the maximum dead time signals discussed above that will trigger a hard switching event if a zero crossing does not occur within the allowed maximum deadtime. Signals ZC_CMP1 and ZC_CMP3 are the outputs of a comparator within zero crossing detector 242 that indicates whether a zero crossing has occurred for the voltage across switches Q1 and Q3, respectively. Finally, signals GATE1 and GATE3 are the gate drive signals for switches Q1 and Q3, which are generated by zero crossing detector circuits 242. More specifically, GATE1 will transition high, corresponding to a turn on of switch Q1 when PWM1 is high and either ZC_CMP1 or MAX_DT1 is high. For purposes of the following discussion, it may be assumed that, for each switch Qx, PWMx transitions high first, and that the GATEx signal will transition high based on the earlier of; (1) a zero crossing of the voltage across the switch (indicated by ZC_CMPx transitioning high) or (2) the expiration of the maximum deadtime (indicated by MAX_DT1 transitioning high).

The following is an exemplary description of an operating cycle of inverter 214. Beginning at time t1, signal PWM3 may transition low, initiating a turn off of switch Q3, as indicated by the off transition of signal GATE3. Signals MAX_DT3 and ZC_CMP3 may also transition low at this time. Thereafter, at time t2, PWM1 may transition high. The deadtime between t1 and t2 may be provided to allow for the off transition of switch Q3 before beginning the turn on of Q1, thereby presenting cross conduction that would short out the DC input of the inverter. However, because the maximum dead time between switching events has not elapsed (MAX_DT1 is not yet high) and there has not been a zero crossing of the voltage across switch Q1 (indicated by ZC_CMP1 remaining low), switch Q1 cannot be turned on yet. Therefore, signal GATE1 remains low. Subsequently, at time t3, a zero crossing of the voltage across switch Q1 occurs, as evidenced by signal ZC_CMP1 transitioning high. This triggers a transition of GATE1 from low to high, turning on switch Q1, which is a soft switching event because it occurs with substantially zero voltage across the switch. At time t4, the maximum dead time for switch Q1 expires, indicated by the transition of MAX_DT1 to high, but because switch Q1 is already on at this point, this transition has no effect.

At time t5, PWM1 transitions low, initiating a turn off of switch Q1, as indicated by the off transition of signal GATE1. The timing of t5 is determined by controller 246, which generates signal PWM1 having a width that determines the on time of switch Q1. Also, at time t5, signals MAX_DT1 and ZC_CMP1 may also transition low. Thereafter, at time t6, PWM3 may transition high. The deadtime between t5 and t6 may be provided to allow for the off transition of switch Q1 before beginning the turn on of Q3, thereby presenting cross conduction that would short out the DC input of the inverter. However, because the maximum dead time between switching events has not elapsed (MAX_DT3 is not yet high) and there has not been a zero crossing of the voltage across switch Q3 (indicated by ZC_CMP3 remaining low), switch Q3 cannot be turned on yet. Therefore, signal GATE3 remains low. Subsequently, at time t7, a zero crossing of the voltage across switch Q3 occurs, as evidenced by signal ZC_CMP3 transitioning high. This triggers a transition of GATE3 from low to high, turning on switch Q3, which is a soft switching event because it occurs with substantially zero voltage across the switch. At time t8, the maximum dead time for switch Q1 expires, indicated by the transition of MAX_DT1 to high, but because switch Q1 is already on at this point, this transition has no effect.

The above-described soft switching cycle running from time t1-t8 repeats at times t9-t16.

As noted above, FIG. 4 illustrates waveforms associated with hard switching of an inverter with conventional PWM signals. Beginning at time t1, signal PWM3 may transition low, initiating a turn off of switch Q3, as indicated by the off transition of signal GATE3. Signals MAX_DT3 and ZC_CMP3 may also transition low at this time. Thereafter, at time t2, PWM1 may transition high. The deadtime between t1 and t2 may be provided to allow for the off transition of switch Q3 before beginning the turn on of Q1, thereby presenting cross conduction that would short out the DC input of the inverter. However, because the maximum dead time between switching events has not elapsed (MAX_DT1 is not yet high) and there has not been a zero crossing of the voltage across switch Q1, switch Q1 cannot be turned on yet. Therefore, signal GATE1 remains low. Subsequently, at time t3, signal MAX_DT1 transitions high, indicating expiration of the maximum dead time for switch Q1. This triggers a transition of GATE1 from low to high, turning on switch Q1, which is a hard switching event because there has not yet been a zero crossing of the voltage across Q1, as evidenced by ZC_CMP1 not yet transitioning high. At time t4, the zero crossing occurs, indicated by the transition of ZC_CMP1 to high, but because switch Q1 is already on at this point, this transition has no effect.

At time t5, PWM1 transitions low, initiating a turn off of switch Q1, as indicated by the off transition of signal GATE1. The timing of t5 is determined by controller 246, which generates signal PWM1 having a width that determines the on time of switch Q1. Also, at time t5, signals MAX_DT1 and ZC_CMP1 may transition low. Thereafter, at time t6, PWM3 may transition high. The deadtime between t5 and t6 may be provided to allow for the off transition of switch Q1 before beginning the turn on of Q3, thereby presenting cross conduction that would short out the DC input of the inverter. However, because the maximum dead time between switching events has not elapsed (MAX_DT3 is not yet high) and there has not been a zero crossing of the voltage across switch Q3, switch Q3 cannot be turned on yet. Therefore, signal GATE3 remains low. Subsequently, at time t7, signal MAX_DT3 transitions high, indicating expiration of the maximum dead time for switch Q3. This triggers a transition of GATE3 from low to high, turning on switch Q3, which is a hard switching event because there has not yet been a zero crossing of the voltage across Q3, as evidenced by ZC_CMP3 not yet transitioning high. At time t8, the zero crossing occurs, indicated by the transition of ZC_CMP3 to high, but because switch Q1 is already on at this point, this transition has no effect.

The above-described soft switching cycle running from time t1-t8 repeats at times t9-t16.

The arrangement and operation above require a total of eight control signals for the inverter switches, namely signals PWM1-PWM4 from PWM controller 246 and signals MAX_DT1-MAX_DT4 from maximum dead time generator. This relatively high number of signals may be suboptimal in some applications, making it desirable to reduce the number of signals required.

Figure 5:
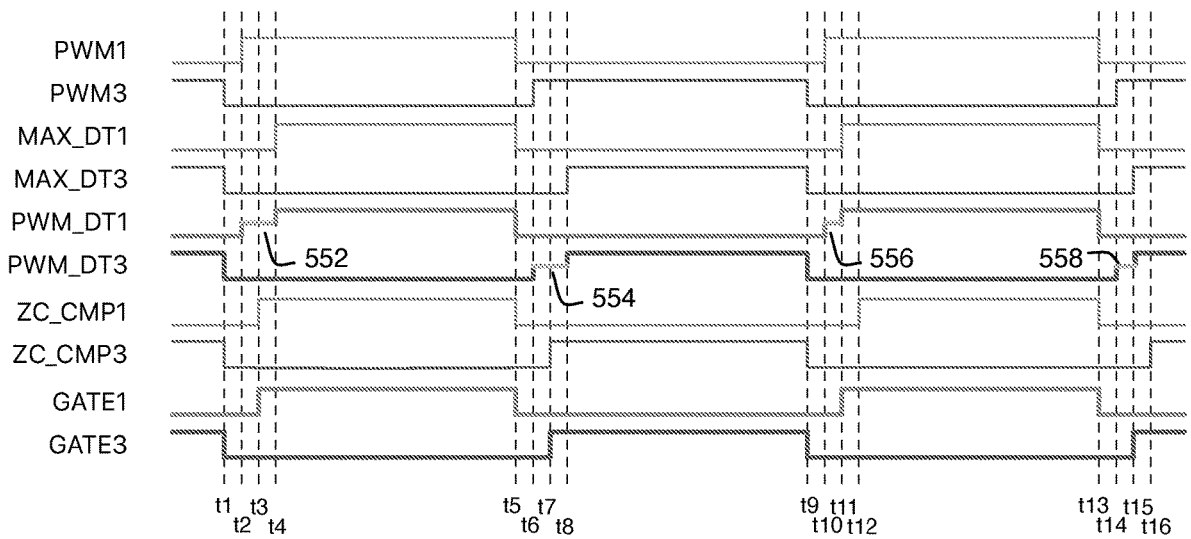
FIG. 5 illustrates waveforms associated with soft switching (left side) and hard switching (right side) using tri-state PWM signals.

FIG. 5 illustrates waveforms in which tri-state PWM signals, i.e., PWM signals having three output levels or states, are used in place of the PWMx and MAX_DTx signals discussed above. These states can be, for example, output signal levels corresponding to a zero level, a middle level, and a high level, with the middle level being located substantially halfway between the zero level and high level. This contrasts with conventional two-level PWM signals as described above. The extra PWM signal level can be used to encode the maximum dead time interval, thereby eliminating the need for the maximum dead time signals described above.

For purposes of illustration, FIG. 5 includes PWM signals PWM1 and PWM3 and maximum dead time signals MAX_DT1 and MAX_DT3 as described above with respect to FIGS. 4 and 5. FIG. 5 also includes signals PWM_DT1 and PWM_DT3, which are tri-state PWM signals as described above that can be used to control the inverter in place of the PWMx and MAX_DTx signals. FIG. 5 illustrates waveforms associated with soft switching (corresponding to FIG. 3) on the left side from times t1-t8 and hard switching (corresponding to FIG. 4) on the right side from times t9-t16.

The following is an exemplary description of an operating cycle of inverter 214 using tri-state PWM signals. Beginning at time t1, signal PWM_DT3 may transition low, initiating a turn off of switch Q3, as indicated by the off transition of signal GATE3. Signal ZC_CMP3 may also transition low at this time. Thereafter, at time t2, PWM_DT1 may transition to an intermediate or middle state between zero and the high state, indicated by signal level 552. The deadtime between t1 and t2 may be provided to allow for the off transition of switch Q3 before beginning the turn on of Q1, thereby presenting cross conduction that would short out the DC input of the inverter. However, because the maximum dead time between switching events has not elapsed (PWM_DT1 is not yet high, but rather in the intermediate state) and there has not been a zero crossing of the voltage across switch Q1 (indicated by ZC_CMP1 remaining low), switch Q1 cannot be turned on yet. Therefore, signal GATE1 remains low. Subsequently, at time t3, a zero crossing of the voltage across switch Q1 occurs, as evidenced by signal ZC_CMP1 transitioning high. This triggers a transition of GATE1 from low to high, turning on switch Q1, which is a soft switching event because it occurs with substantially zero voltage across the switch.

At time t4, the maximum dead time for switch Q1 expires, indicated by the transition of PWM_DT1 to high, but because switch Q1 is already on at this point, this transition has no effect.

At time t5, PWM1_DT1 transitions low, initiating a turn off of switch Q1, as indicated by the off transition of signal GATE1. The timing of t5 is determined by controller 246, which generates signal PWM1 having a width that determines the on time of switch Q1. Also, at time t5, signal ZC_CMP1 may also transition low. Thereafter, at time t6, PWM_DT3 may transition to intermediate state 554. The deadtime between t5 and t6 may be provided to allow for the off transition of switch Q1 before beginning the turn on of Q3, thereby presenting cross conduction that would short out the DC input of the inverter. However, because the maximum dead time between switching events has not elapsed (PWM_DT3 is not yet high) and there has not been a zero crossing of the voltage across switch Q3 (indicated by ZC_CMP3 remaining low), switch Q3 cannot be turned on yet. Therefore, signal GATE3 remains low. Subsequently, at time t7, a zero crossing of the voltage across switch Q3 occurs, as evidenced by signal ZC_CMP3 transitioning high. This triggers a transition of GATE3 from low to high, turning on switch Q3, which is a soft switching event because it occurs with substantially zero voltage across the switch. At time t8, the maximum dead time for switch Q1 expires, indicated by the transition of PWM_DT1 from the intermediate state to high, but because switch Q1 is already on at this point, this transition has no effect.

As noted above, the right side of FIG. 5 illustrates waveforms associated with hard switching of an inverter with tri-state PWM signals. Beginning at time t9, signal PWM_DT3 may transition low, initiating a turn off of switch Q3, as indicated by the off transition of signal GATE3. Signal ZC_CMP3 may also transition low at this time. Thereafter, at time t10, PWM_DT1 may transition to intermediate state 556. The deadtime between t9 and t10 may be provided to allow for the off transition of switch Q3 before beginning the turn on of Q1, thereby presenting cross conduction that would short out the DC input of the inverter. However, because the maximum dead time between switching events has not elapsed (PWM_DT1 is not yet high) and there has not been a zero crossing of the voltage across switch Q1 (indicated by ZC_CMP1 remaining low), switch Q1 cannot be turned on yet. Therefore, signal GATE1 remains low. Subsequently, at time t11, signal PWM_DT1 transitions high, indicating expiration of the maximum dead time for switch Q1. This triggers a transition of GATE1 from low to high, turning on switch Q1, which is a hard switching event because there has not yet been a zero crossing of the voltage across Q1, as evidenced by ZC_CMP1 not yet transitioning high. At time t12, the zero crossing occurs, indicated by the transition of ZC_CMP1 to high, but because switch Q1 is already on at this point, this transition has no effect.

At time t13, PWM_DT1 transitions low, initiating a turn off of switch Q1, as indicated by the off transition of signal GATE1. The timing of t13 is determined by controller 246, which generates signal PWM_DT1 having a width that determines the on time of switch Q1. Also, at time t13, signal ZC_CMP1 may also transition low. Thereafter, at time t14, PWM_DT3 may transition to its intermediate state. The deadtime between t13 and t14 may be provided to allow for the off transition of switch Q1 before beginning the turn on of Q3, thereby presenting cross conduction that would short out the DC input of the inverter. However, because the maximum dead time between switching events has not elapsed (PWM_DT3 is not yet high) and there has not been a zero crossing of the voltage across switch Q3 (indicated by ZC_CMP1 remaining low), switch Q3 cannot be turned on yet. Therefore, signal GATE3 remains low. Subsequently, at time t15, signal PWM_DT3 transitions high, indicating expiration of the maximum dead time for switch Q3. This triggers a transition of GATE3 from low to high, turning on switch Q3, which is a hard switching event because there has not yet been a zero crossing of the voltage across Q3, as evidenced by ZC_CMP3 not yet transitioning high. At time t16, the zero crossing occurs, indicated by the transition of ZC_CMP3 to high, but because switch Q1 is already on at this point, this transition has no effect.

The above description assumes that the low state of the PWM_DTx signals corresponds to the switch being off, the intermediate state corresponds to the interval before the maximum dead time has elapsed, during which the switch may turn on if a zero crossing occurs, and the high state corresponds to the expiration of the maximum dead time, at which the switch should be turned on regardless of whether it will be a non-ZVS/hard switching event. However, this assignment of states could be altered. For example, the high state could correspond to the pre-max dead time interval when a ZVS switching event could occur, with a transition to the intermediate state upon expiration of the maximum dead time, at which point the switching transition must occur, even if it will be a hard switching event. Likewise, the low state of the PWM_DT signals could correspond to one of the switched on states. Any arrangement of the three distinct output levels of the signal (e.g., different voltages) could be assigned to any of the categories of switching, i.e., off, switching permitted if ZVS, and switching required (whether ZVS or not).

Figure 6:
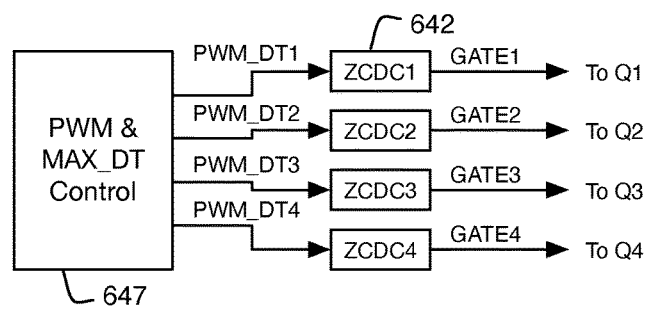
FIG. 6 illustrates a PWM and Maximum Dead Time controller that generates tri-state output signals that can be provided to zero crossing detector circuits to generate gate drive signals for respective switching devices.

In any case, tri-state PWM signals having three distinct output levels can allow for only a single control signal to be provided to each inverter switch, or, more specifically, to the zero crossing detector 242 of each switch. Such an arrangement is illustrated in FIG. 6, in which a PWM and Maximum Dead Time controller 647 generates tri-state output signals PWM_DT1-PWM_DT4, as described above. These tri-state output signals, having three distinct levels, can be provided to zero crossing detector circuits 642 similar to those described above with reference to FIG. 2, but having only a single input for the PWM and max dead time signals along with input(s) for the voltage across the switch, not shown in FIG. 6, but illustrated in FIG. 2. As described above, the zero crossing detector circuits 642 can include logic that generates the gate drive signals GATE1-GATE4 as described above, with these gate drive signals being delivered to the respective switching devices, optionally via signal conditioning circuitry not shown in FIG. 6, but as described above with respect to FIG. 2.

The foregoing describes exemplary embodiments of inverters with tri-state PWM control. Such systems may be used in a variety of applications but may be particularly advantageous when used in conjunction with wireless power transfer systems for personal electronic devices such as mobile computing devices (e.g., laptop computers, tablet computers, smart phones, and the like) and their accessories (e.g., wireless earphones, styluses, and other input devices, etc.) as well as wireless charging accessories (e.g., charging mats, pads, stands, etc.). Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that can transmit certain information amongst the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A wireless power transmitter comprising:
a wireless power transmitter coil adapted to magnetically couple the wireless power transmitter to a wireless power receiver;
a resonant capacitor coupled to the wireless power transmitter coil to form a resonant circuit; and
an inverter having an input that receives a DC voltage and an AC output coupled to the resonant circuit, the inverter further comprising:
a plurality of switching devices coupled between the input and AC output of the inverter;
a controller configured to generate pulse width modulated (PWM) drive signals for the plurality of switching devices, wherein the PWM drive signals are tri-state PWM signals having three output levels; wherein:
in a first state of a tri-state PWM signal corresponding to a first output level of the three output levels, the corresponding switching device is turned off;
in a second state of the tri-state PWM signal corresponding to a second output level of the three output levels, the corresponding switching device is forced on in a hard switching event; and
in a third state of the tri-state PWM signal corresponding to a third output level of the three output levels, the corresponding switching device is allowed to turn on in a soft switching event upon occurrence of a zero crossing of the voltage across the corresponding switching device; and
circuitry that receives the PWM drive signals for corresponding switching devices and signals corresponding to voltages across the corresponding switching devices and generates gate drive signals for the corresponding switching devices.

2. The wireless power transmitter of claim 1 wherein the controller includes a maximum dead time generator that determines a maximum dead time between deactivation of a first switching device and activation of a second, complementary switching device.

3. The wireless power transmitter of claim 2 wherein the maximum dead time is encoded in one of the three output levels of the tri-state PWM signals.

4. The wireless power transmitter of claim 1 wherein the first output level is a zero voltage level, the second output level is a high voltage level, and the third output level is an intermediate voltage level between the zero voltage level and the high voltage level.

5. The wireless power transmitter of claim 1 wherein the PWM drive signals regulate an output voltage of the inverter.

6. The wireless power transmitter of claim 1 wherein the PWM drive signals regulate an output power level of the inverter.

7. The wireless power transmitter of claim 1 wherein the circuitry that receives the PWM drive signals for corresponding switching devices and signals corresponding to voltages across the corresponding switching devices and generates gate drive signals for the corresponding switching devices includes zero crossing detection circuitry.

8. An inverter having an input that receives a DC voltage and an AC output coupled to a resonant circuit, the inverter comprising:
a plurality of switching devices coupled between the input and AC output of the inverter;
a controller configured to generate pulse width modulation (PWM) drive signals for the plurality of switching devices, wherein:
the PWM drive signals are tri-state PWM signals having three output levels;
in a first state of a tri-state PWM signal corresponding to a first output level of the three output levels, the corresponding switching device is turned off;
in a second state of the tri-state PWM signal corresponding to a second output level of the three output levels, the corresponding switching device is forced on in a hard switching event; and
in a third state of the tri-state PWM signal corresponding to a third output level of the three output levels, the corresponding switching device is allowed to turn on in a soft switching event upon occurrence of a zero crossing of the voltage across the corresponding switching device; and
circuitry that receives PWM drive signals for corresponding switching devices and signals corresponding to voltages across the corresponding switching device and generates gate drive signals for the corresponding switching devices.

9. The inverter of claim 8 wherein the first output level is a zero voltage level, the second output level is a high voltage level, and the third output level is an intermediate voltage level between the zero voltage level and the high voltage level.

10. The inverter of claim 8 wherein the controller includes a maximum dead time generator that determines a maximum dead time between deactivation of a first switching device and activation of a second, complementary switching device.

11. The inverter of claim 10 wherein the maximum dead time is encoded in one of the three output levels of the tri-state PWM signals.

12. The inverter of claim 8 wherein the PWM drive signals regulate an output voltage of the inverter.

13. The inverter of claim 8 wherein the PWM drive signals regulate an output power level of the inverter.

14. The inverter of claim 8 wherein the circuitry that receives PWM drive signals for corresponding switching devices and signals corresponding to voltages across the corresponding switching device and generates gate drive signals for the corresponding switching devices includes zero crossing detection circuitry.

15. A switching converter that converts an input voltage into an output voltage, the switching converter comprising one or more switching device pairs each comprising switching devices operated by tri-state pulse width modulation (PWM) drive signals having a first output level, a second output level, and a third output level; and control circuitry including:
a pulse width modulation (PWM) controller that generates raw PWM signals corresponding to the one or more switching device pairs;
zero crossing detector circuitry that senses voltages across corresponding switching devices;
a maximum dead time generator that determines a maximum dead time between deactivation of a first switching device and activation of a second, complementary switching device of a switching device pair; and control logic that combines output signals from the PWM controller, the zero crossing detector circuitry, and the maximum dead time generator to generate the tri-state PWM drive signals, wherein:
- in a first state of a tri-state PWM drive signal, the corresponding switching device is turned off;
- in a second state of the tri-state PWM drive signal, the corresponding switching device is forced on; and
- in a third state of the tri-state PWM drive signal, the corresponding switching device is allowed to turn on upon occurrence of a zero crossing of the voltage across the corresponding switching device.

16. The switching converter of claim 15 wherein the first output level is a zero voltage level, the second output level is a high voltage level, and the third output level is an intermediate voltage level between the zero voltage level and the high voltage level.

17. A wireless power transmitter comprising the switching converter of claim 15.

18. The wireless power transmitter of claim 17 wherein an output of the switching converter is coupled to a resonant circuit comprising a wireless power transmitter coil of the wireless power transmitter.

19. The wireless power transmitter of claim 17 wherein the tri-state PWM drive signals regulate an output voltage of the switching converter.

20. The wireless power transmitter of claim 17 wherein the tri-state PWM drive signals regulate an output power level of the switching converter.

* * * * *